United States Patent [19]

Roth et al.

[11] Patent Number: 5,003,311

[45] Date of Patent: Mar. 26, 1991

[54] FIBER COMPOSITE WITH LAYERS MATCHED TO PEAK RADAR WAVE ATTENUATION

[75] Inventors: Siegfried Roth, Salem; Horst Schneider, Meersburg; Wilhelm Wulbrand, Friedrichshafen; Wolfgang Englehardt, Wuppertal, all of Fed. Rep. of Germany

[73] Assignee: Dornier GmbH, Friedrichshafen, Fed. Rep. of Germany

[21] Appl. No.: 25,286

[22] Filed: Jan. 30, 1987

[51] Int. Cl.$^5$ ............... H01Q 17/00; C11D 15/04; B32B 5/12

[52] U.S. Cl. .......................... 342/4; 342/2; 252/511; 156/279; 428/113; 428/367; 428/294; 428/408; 428/298

[58] Field of Search ............. 428/408, 113, 294, 298, 428/367; 252/511; 342/2–4; 156/279

[56] References Cited

U.S. PATENT DOCUMENTS

| | | |
|---|---|---|
| 4,404,125 | 9/1983 | Abolins et al. .............. 524/441 X |
| 4,435,465 | 3/1984 | Ebneth et al. .............. 428/195 |
| 4,471,015 | 9/1984 | Ebneth et al. .............. 428/208 X |
| 4,474,685 | 10/1984 | Annis .............. 252/511 X |
| 4,566,990 | 1/1986 | Liu et al. .............. 524/440 X |
| 4,596,670 | 6/1986 | Liu .............. 252/511 |
| 4,610,808 | 9/1986 | Kleiner .............. 252/513 X |
| 4,674,714 | 3/1987 | Goto .............. 428/681 X |

Primary Examiner—Peter A. Nelson
Attorney, Agent, or Firm—Connolly & Hutz

[57] ABSTRACT

The fiber composite for bearing structures for absorption of electromagnetic waves consists in its structure of at least three layers (2, 3, 4, 5, 6, 7, 8, 9) to be different in their electromagnetic material constants, whereby one or more fiber layers (10, 11, 12, 13, 14, 15, 16, 17, 18, 19, 20, 21, 23, 24) are used for the layers (2 to 9). The fiber layers demonstrate alternately by layers a high or low electrical conductivity such that the electromagnetic material constants of the layers (2 to 9) composed of the fiber layers (13 to 21 and 23, 24) and binder and the layer thicknesses are matched to one another such that the reflection attenuation is integrally maximized in a given frequency range.

10 Claims, 1 Drawing Sheet

FIBER COMPOSITE WITH LAYERS MATCHED TO PEAK RADAR WAVE ATTENUATION

The invention concerns a fiber composite for load bearing structures for absorption of electromagnetic waves.

Fiber composites for load bearing structures are characterized by a high specific strength and stiffness which are essentially determined by the fibers used and the fiber volume percent. The matrix, which usually consists of an organic resin, bonds the individual fiber layers into a composite. High chemical and mechanical demands are placed on the matrix. In aircraft construction, fiber composites are predominantly used stacked as preimpregnated fiber stacks—so—called prepregs—and hardened in an autoclave process.

With these kinds of structures consisting of metal and fiber composites, special foils, layers or mats are additionally applied, e.g., by bonding, for the absorption of electromagnetic waves. Disadvantages are the additional weight, the high risk during bonding, and durability, e.g., fraying at the edges of the mats or layers, the aerodynamic impairment due to the increased surface roughness and the joints of the abutting mats or layers and the increased maintenance expense due to inspection of the layers for separation.

From the DE-OS No. 31 17 245, a procedure is known for camouflaging any desired predominantly metal objects against radar detection, as well as protection of any desired objects against electromagnetic fields, which objects have on their surface, wholly or partly, a metallized textile pole material, with the side possessing the pole placed in the direction of the incident radiation. A disadvantage here is the fact that the pole material is a layer additionally applied to an object's surface, e.g., by bonding, and thus provides an additional weight and at the same time no load bearing function. Due to its low resistance to stressing, e.g., rain erosion, and due to the aerodynamic surface quality, pole material is not suitable for application on exterior surfaces of aircraft.

An absorber for electromagnetic waves familiar from DE-OS No. 33 11 001 uses for this purpose fibers which consist primarily of silicon carbide (Si—C) and which are suitable as a fiber composite. The structure described therein consists of a Si—C fabric or a resin-fabric composite, where the fibers must display a suitable conductivity, and a metallic reflector is used as seal (back side). The design of this absorber is based on the method of operation of the "λ/4" layer absorber. The thickness of the homogeneous absorber layer without the reflecting seal is thereby one-fourth of the resonance wavelength, if electrical losses are disregarded. The metal plate provided as a reflector does not represent a natural component of the fiber composite, which is a disadvantage for a load bearing structure.

With an absorber arrangement familiar from the literature JP-Kokai No. 52-44542, there is a thin carbon-fiber layer on the front of an inductor, and a reflective layer on the back. Here, too, the carbon-fiber layer used has no load bearing function; it serves merely for stiffening and as temperature protection for the inductor.

A device known from U.S. Pat. No. 2,599,944 uses for the absorption of high frequency electromagnetic radiation, a container the walls of which consist of different materials such as wood, metal and a textile linen arranged on top of one another in layers of varying thickness. In principle the layered structure of the wall is such that the outer layer consists of a metal plate, the middle one of wood and the inner layer of a textile linen coated with graphite. The metal plate can be arranged between two wood layers. A load bearing structure such as is necessary in aircraft construction is also not present here.

Finally, a multilayer fiber composite for load bearing structures is known from DE-OS No. 33 07 066 where an electromagnetic effect is obtained by the use of fillers whose concentration increases toward the surface which faces away from the irradiated surface. A disadvantage here is the fact that introducing the fillers into the fiber composite requires a great deal of precision during manufacture, because in the event of inexactnesses of the individual layer thickness and inhomogeneities, the prescribed frequency bandwidth and the attenuation are negatively affected, and thus the desired effect of absorption is achieved only insufficiently. Here the principle of the so-called inhomogeneous absorber with quasi continuous material transition is realized (compare, for example, Meyer, E. and Pottel, R., Fortschritte der Hochfrequenztechnik (Advances in High Frequency Engineering), Volume 5, 1960).

The task of the present invention is to develop a fiber composite for load bearing structures such that on the one hand, it displays the necessary properties, such as excellent mechanical, thermal and chemical resistance and, on the other hand, is at the same time so constructed that it absorbs electromagnetic waves or radiation in a prescribed frequency range in a way which is at least equivalent to corresponding conventional absorbers.

With the same objective, the absorber according to the present invention differs from the familiar absorbers (DE-OS Nos. 33 07 066 and 33 11 001) in two regards. Firstly, the design here is based on an entirely different absorption principle and, secondly, the use of fillers is entirely or partly dispensed with here. The absorber design can be realized with nothing but fibers and fabrics in combination with binders used as a matrix and natural components of fiber composites. From this is derived the additional advantage that familiar criteria can be referred to in the structural design in regard to the mechanical requirements (load bearing structure). To the extent that this advantage is not of particular interest, the structural depth of the absorber can be reduced by minimal proportions of fillers if necessary.

The design of the absorber according to the present invention is based on the principle of the Salisbury screen (cf. Salisbury, W. W., U.S. Pat. No. 2,599,944) which is also familiar as the principle of the foil absorber (compare, for example, Meyer, E. and Pottel, R. in Fortschritte der Hochfrequenztechnik (Advances in High Frequency Engineering), Volume 5, 1960); however, the customary design criteria regarding the properties of the so-called foil and the intermediate layer dielectric are deliberately modified. The requirement for low foil thickness, negligibility of polarization currents in the foil layer and power currents in the dielectric is not retained here. These conditions are appropriate when the parameters necessary for the design must be determined with analytical means. The use of electronic computers permits dispensing with the restrictions and obtaining advantages in this way in regard to bandwidth and structural depth.

According to the present invention no restriction is made regarding the material for the fabric to be used. A Si—C fabric of appropriate conductivity is suitable in particular for the volumetrically non-essential component which comprises the layers to be designated as "foils," but a C fiber with selected resistance can be used just as well. A C fiber layer of extremely high electrical conductivity, whose characteristic wave impedance nearly disappears, is appropriate as the reflective terminating layer. A metal plate as provided for in known absorbers can also satisfy the requirements, but as a rule will satisfy the requirements to a lesser degree since it does not represent a natural component of the fiber composite.

Design examples are described below and explained by means of sketches.

Figure 1:
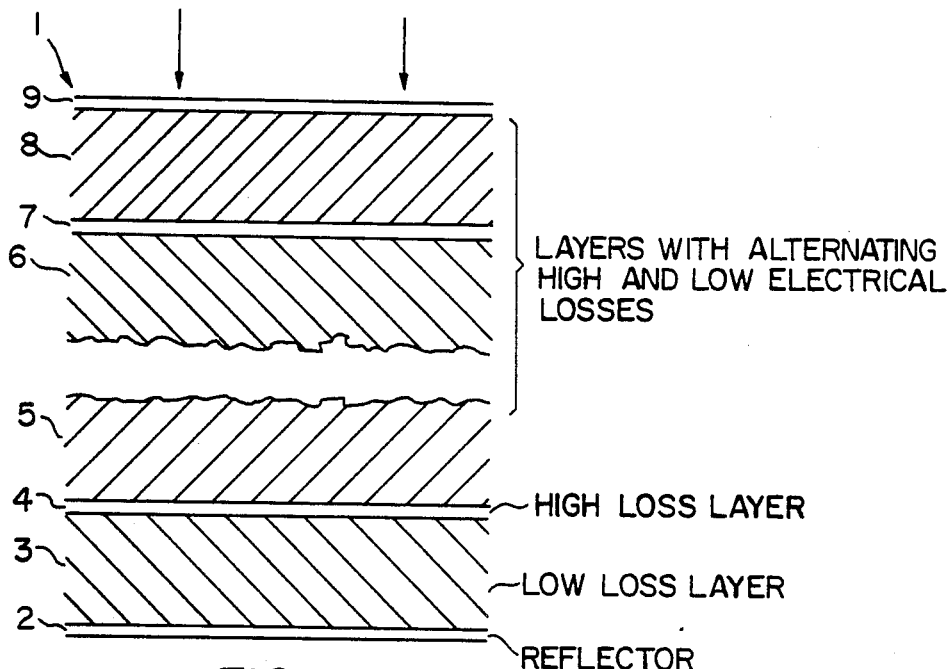
FIG. 1 shows a fiber composite in principle made of eight different layers.

FIG. 1 shows the principal construction of a fiber composite 1 of the type according to the present invention. As an example, the fiber composite here consists of eight layers 2, 3, 4, 5, 6, 7, 8 and 9, to be differentiated from one another. Of these, the lower layer 2, away from the incident electromagnetic radiation, serves as a reflector, which does not have to possess an ideal reflectance. Following on top of this layer 2 which is made using an extremely highly conductive fiber, is a so-called intermediate layer dielectric 3, for which high ohm or virtually non-conductive fibers are used. The following layer 4, described as a modified foil, displays relatively high losses. It is made with fibers whose conductivity assumes high values compared to those in the intermediate layer dielectric 3, but which is upwardly restricted by the fact that layer 4 must be partially permeable to the incident radiation. Additional layers 5, 6, 7, 8 and 9 are alternately of the described type 3 and 4, both forms being possible as the top layer. Layers 4, 7, 9, which display relatively high electrical losses, may differ from each other in regard to their electromagnetic constants. The same applies for the intermediate layer dielectrics 3, 5, 6, 8.

Figure 2:
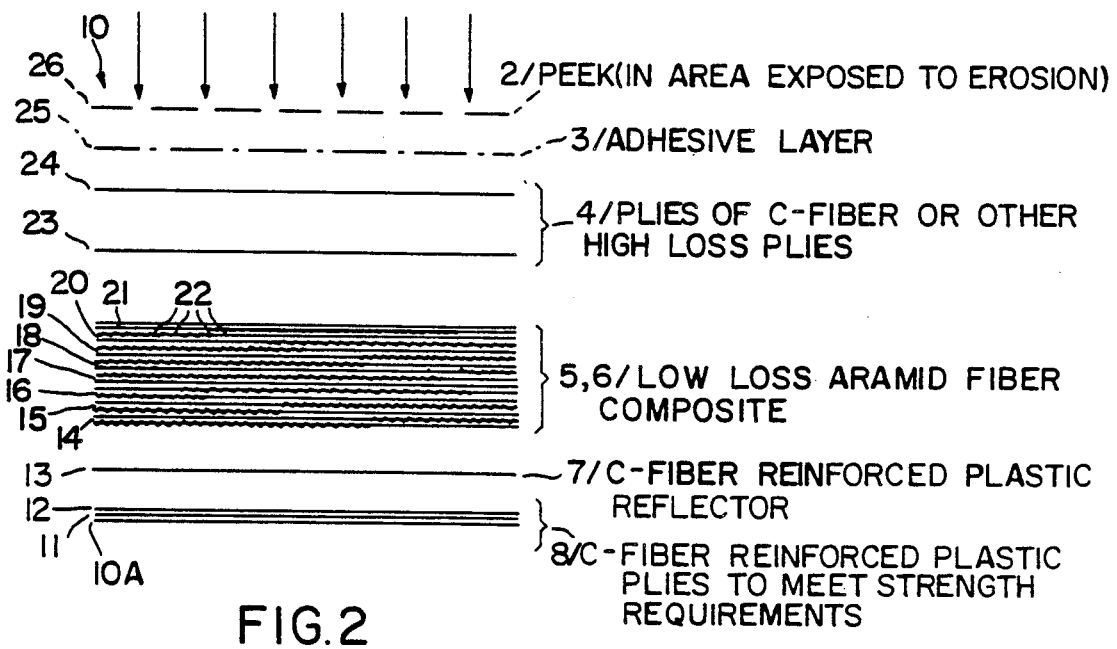
FIG. 2 shows a fiber composite of three layers and an additional protective layer in a detailed view.

FIG. 2 shows a matrix construction 10 of the general principle provided in FIG. 1 in its simplest design, with the individual layers described in detail. For example, layer 2 consists of several layers of chemical fiber reinforced plastic 10A, 11, 12, 13, with layer 13 serving as a reflector and the additional layers 10A, 11, 12 being used for accomodation to the strength requirements. The specific resistance for the fabric of the reflector has values of $\approx 10^{-6}$ $\Omega$cm, for example. Following on layer 2 is the intermediate layer dielectric 3 which consists, for example, of an aramide fiber composite (AFK) with the fiber layers 14, 15, 16, 17, 18, 19, 20, 21. If a kevlar fiber is used, for example, the layer is transparent for the incident waves, in other words, virtually loss-free. Kevlar displays a low specific weight and thus provides a favorable weight solution. If necessary for reduction of structural depth, minimal filler components 22 may be introduced. The top layer 4 or 9 may be made of two layers of C fabric 23, 24, for example, which possesses a specific resistance of $\approx 20$ $\Omega$cm, small compared to the fiber used for the intermediate layer 3. In this version, the layer 4 thus produced displays a real component of the dielectric constants which is not negligible, that is, the polarization currents which occur must be taken into account in the design. In addition, the thickness of the layer 4 must be regarded as not small compared with the reciprocal value of the component of the complex wave number. Thus the construction does not correspond to the customary criteria of a foil absorber with which, instead of this layer 4, a metal foil is used having a surface resistance which is equal to the free field wave resistance in vacuo of 377 $\Omega$. Apart from the mechanical advantages, FIG. 2 this design also proves advantageous for bandwidth and structural depth. Layer 9, specifically in the area of rain erosion, can be coated with a protective layer 25, 26 of thermoplastic material, e.g., a thin PEEK coating, which must be taken into account in the design and causes no disadvantages in regard to reflection attenuation.

The effect of the fiber composite as an absorber is based on a construction in a form which represents a modification of the so-called foil absorber. For the fiber composite this means, in its simplest design, a structure of three layers differing in their electromagnetic constants: a highly conductive fiber plastic (FP) layer as reflector, a relatively transparent layer of high ohm fibers such as kevlar, and a foil layer which is produced, for example, with a suitably prepared C fiber, a metallized fiber or a SiC fiber. Instead of the kevlar fiber for the intermediate layer, a glass fiber, a ceramic fiber ($Al_2O_3$) and a relatively high-ohm SiC fiber can be used.

The sensitivity of an absorber to impact, shock and tearing is increased by the use of thermoplastic matrices. By selecting suitable fibers with corresponding thermal coefficients of expansion, the same thermal expansions occur in the individual layers during warming, whereby internal stresses remain small.

What is claimed is:

1. A fiber composite load-bearing structure characterized by at least three bonded-together fiber-containing layers different in their electromagnetic constants, the fiber layers having alternately by layers a high and low electrical conductivity such that the electromagnetic constants of the fiber and binder, as well as the layer thicknesses, are matched to one another to peak the reflection attenuation of impinging radar waves in a given frequency range.

2. A fiber composite according to claim 1, characterized by the fact that the deepest layer effective for the reflection attenuation displays a high reflectivity.

3. A fiber composite according to claim 2, characterized by the fact that an electrically highly conductive fiber is used for said deepest layer.

4. A fiber composite according to claim 1, characterized by the fact that fillers are incorporated in the layers for which fibers with lower electrical conductivity are used.

5. A fiber composite according to claim 4, characterized by the fact that the proportion of fillers in the individual lower electrical conductivity layers may be different.

6. A fiber composite according to claims 1, 4 or 5, characterized by the fact that the layers for which fibers with low electrical conductivity are used, may display conduction currents which are not negligible.

7. A fiber composite according to claim 1, characterized by the fact that the layers for which fibers with high electrical conductivity are used, may display polarization currents which are not negligible.

8. A fiber composite according to claims 1 or 7, characterized by the fact that the high electrical conductivity layers possess thicknesses such that the products of the respective thickness and the respective component of the complex wave number must not be small compared to 1.

9. A fiber composite according to any of claims 1 through 8, characterized by the fact that the binder resins are selected from duroplastic resins and thermoplastic resins.

10. A fiber composite according to any of claims 1 through 9, characterized by the fact that the first layer toward the incident waves is coated with an anti-erosion layer.

* * * * *